United States Patent
Rosca et al.

(10) Patent No.: US 10,635,094 B2
(45) Date of Patent: Apr. 28, 2020

(54) FAILURE MODELS FOR EMBEDDED ANALYTICS AND DIAGNOSTIC/PROGNOSTIC REASONING

(71) Applicant: Siemens Aktiengesellschaft, Munich (DE)

(72) Inventors: Justinian Rosca, West Windsor, NJ (US); Steffen Lamparter, Feldkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/329,383

(22) PCT Filed: Sep. 16, 2016

(86) PCT No.: PCT/US2016/052025
§ 371 (c)(1),
(2) Date: Feb. 28, 2019

(87) PCT Pub. No.: WO2018/052433
PCT Pub. Date: Mar. 22, 2018

(65) Prior Publication Data
US 2019/0196460 A1    Jun. 27, 2019

(51) Int. Cl.
*G05B 23/02*    (2006.01)
*G05B 19/042*    (2006.01)
(Continued)

(52) U.S. Cl.
CPC ..... *G05B 23/0248* (2013.01); *G05B 19/0428* (2013.01); *G05B 23/0243* (2013.01); *G05B 23/0254* (2013.01); *G05B 23/0278* (2013.01); *G06N 5/022* (2013.01); *G06N 7/005* (2013.01); *G05B 2219/49181* (2013.01); *G05B 2223/02* (2018.08)

(58) Field of Classification Search
None
See application file for complete search history.

(56) References Cited

U.S. PATENT DOCUMENTS

2012/0185728 A1*  7/2012  Guo ............... G06K 9/6256
                                                    714/26
2015/0120640 A1*  4/2015  Machida ......... G06F 11/008
                                                    706/52

FOREIGN PATENT DOCUMENTS

CH          700936 B1     11/2010
WO     2013104419 A1      7/2013
WO     2015099964 A1      7/2015

OTHER PUBLICATIONS

International Search Report dated Mar. 23, 2016; Application No. PCT/US2016/052025; Filing Date: Sep. 16, 2016; 17 pages.

* cited by examiner

*Primary Examiner* — Thomas S McCormack (57) ABSTRACT

A computer-implemented method for detecting faults and events related to a system includes receiving sensor data from a plurality of sensors associated with the system. A hierarchical failure model of the system is constructed using (i) the sensor data, (ii) fault detector data, (iii) prior knowledge about system variables and states, and (iii) one or more statistical descriptions of the system. The failure model comprises a plurality of diagnostic variables related to the system and their relationships. Probabilistic reasoning is performed for diagnostic or prognostic purposes on the system using the failure model to derive knowledge related to potential or actual system failures.

17 Claims, 5 Drawing Sheets

(51) Int. Cl.
*G06N 5/02* (2006.01)
*G06N 7/00* (2006.01)

FAILURE MODELS FOR EMBEDDED ANALYTICS AND DIAGNOSTIC/PROGNOSTIC REASONING

This application is a national phase filing under 35 U.S.C. § 371 of International Patent Application No. PCT/US2016/052025, filed Sep. 16, 2016, which is incorporated herein by reference in its entirety

TECHNICAL FIELD

The present invention relates generally to improving the resiliency of control systems, with respect to the construction and use of failure models for embedded analytics and diagnostic/prognostic reasoning. The disclosed technology may be applied to, for example, various automated production environments where industrial controllers such as programmable logic controllers (PLCs) and distributed control systems (DCS) are used.

BACKGROUND

In conventional industrial automation systems, alarm messages are used as important means for protecting against consequential damage, for monitoring the deviation from healthy operation of machines and systems, and for guiding maintenance activities. Alarms can be triggered on all levels of an automation system or machine data acquisition and supervision system from field devices up to the supervisory control and data acquisition (SCADA) and manufacturing execution systems (MES) level, or even backend level (e.g., through cloud analytics). However, alarm systems are common at the field level, which is where operation and control decisions are taken, and also where the context of operation and measurement and high resolution sensor data are readily available.

Alarms are typically manually defined or programmed by the integrators or operators of a component/device/machine/system. They could be generated automatically by analytics, for example, when a value is above threshold or in response to more advanced triggers (e.g., abnormality is detected when comparing a historical signature of the data with new incoming data). Alarms and additional symptoms in abnormal sensor data or operation of the machine are assumed precursors for failures. Failures can become causes for more significant failures.

A single failure often has implication on many different subsystems, components, and processes. Therefore in a large-scale infrastructure or complex system (e.g., an industrial automation line, a bogie, a turbine, a transformer, etc.), one problem might cause tens or even hundreds of subsequent different alarms distributed across the infrastructure, which further may point in a large variety of directions. At the other end, a cause may stay hidden for a long time and result in expensive consequential damage measured in downtime, repair costs, etc. For operators and maintenance personnel, it can be very cumbersome, time consuming, and difficult to determine which alarms are critical, diagnose causes of apparent disoperation, what is causing what, which alarm is the root cause.

SUMMARY

Embodiments of the present invention address and overcome one or more of the above shortcomings and drawbacks, by providing methods, systems, and apparatuses related to construction and use of failure models for embedded analytics and diagnostic/prognostic reasoning. More specifically, the failure models described herein stand as foundation for knowledge-based approaches in evidential reasoning about failures, root cause analysis, diagnostic and prognostic analytics. As described in further detail below, these failure models may be constructed by combining graph-based (i.e., graphical) models and statistical models with state information of the production processes/assets and operational data.

According to one aspect of the present invention, a computer-implemented method for detecting faults and events related to a system includes receiving or retrieving sensor data from a plurality of sensors associated with the system. A hierarchical failure model of the system is constructed using (i) the sensor data, (ii) fault detector data, (iii) prior knowledge about system variables and states, and (iii) one or more statistical descriptions of the system (e.g., cause likelihoods, fault probabilities and conditional relationships from service or prior operation in specified conditions). The failure model comprises a plurality of diagnostic variables related to the system and their relationships. These diagnostic variables may comprise, for example, internal system variables related to one or more system components and/or external system variables related to an operating environment of the system. Additionally, the failure model may include event and normality variables specifying normal and abnormal system states. Probabilistic reasoning is performed for diagnostic or prognostic purposes on the system using the failure model to derive knowledge related to potential or actual system failures.

In some embodiments, the knowledge derived with the aforementioned method comprises information indicating a likelihood of particular failure states over time. In other embodiments, the knowledge comprises a list of system components ranked according to likelihood of causing the potential or actual system failures.

Various techniques may be used to augment failure model construction in the aforementioned method. For example, in some embodiments, the failure model is further constructed using manually collected system state information. This manually collected system state information may include, for example, maintenance data indicating states of one or more system variables. The states of the system variables may each represented, for example, as a probability distribution. In other embodiments, the failure model is further constructed using a hierarchy of failure variables related to the system comprising classes and subclasses related by an is-a relationship. Alternatively (or additionally), the failure model may be further constructed using an ontology of failure variables related to the system comprising classes and subclasses related by a has-an-effect-on relationship or an influences relationship.

According to other embodiments of the present invention, a system for detecting faults and events related to an industrial system comprises at least one processor and a non-transitory, computer-readable storage medium in operable communication with the at least one processor. The computer-readable storage medium contains one or more programming instructions that, when executed, cause the at least one processor to receive or retrieve sensor data from a plurality of sensors associated with the industrial system and to construct a failure model of the industrial system using the sensor data and one or more statistical models of the industrial system. As with the method discussed above, the failure model comprises diagnostic variables related to the industrial system. The instructions further cause the processor(s) to perform diagnostic or prognostic analytics and reasoning on the industrial system using propagation of uncertainties in the failure model to derive knowledge related to potential or actual industrial system failures. The aforementioned system may be augmented, refined, or otherwise modified using features which are similar to the method discussed above.

According to another aspect of the present invention, as described in some embodiments, a system for detecting faults and events related to an industrial system comprises one or more receiver modules, a database, a software application, and a display. The one or more receiver modules are configured to receive or retrieve sensor data from a plurality of sensors associated with the industrial system. The database comprises one or more one statistical models of the industrial system. The software application is configured to construct a failure model of the industrial system using the sensor data. This failure model comprises diagnostic variables related to the industrial system. The software application is further configured to perform diagnostic or prognostic reasoning on the industrial system using the failure model to derive knowledge related to potential or actual industrial system failures. The display presents the derive knowledge related to potential or actual industrial system failures to a user.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to construction and use of failure models for embedded analytics and diagnostic/prognostic reasoning. The techniques described herein empower embedded devices with flexible embedded analytic capability to convert imprecise and incomplete data (coming from sensors, maintenance, etc.) into knowledge and use the knowledge further to reason about the operating state of the machine/device or influence its behavior. These techniques provide a systematic way to define failure knowledge, and the failure model as well as a formalization of the basic architecture, concepts, and tasks needed for failure modeling. Additionally, the failure model enables effective reasoning with uncertain information at the device level, and generation of knowledge from data. The failure model also allows the exploitation of numerical models, which may be used needed to generate specific data grounded in physics to generate parameters, thresholds, and even raw (synthetic) data needed to learn components used by this approach.

For complex systems, the actual data flows and history of measurements and system status at the embedded control/ supervision level constitute context information that could be organized and support diagnostic and prognostic functions: finding the root cause of alarms and predicting their impact. Elements such as an asset model, process model, environment model, control model are useful basis to automatically build the failure reasoning framework, but are not sufficient. The failure model described herein provides a feature aside from the other elements like the ones mentioned above.

Context information can provide knowledge about the sensor signals that trigger an alarm and show how these sensors depend on other variables throughout the system. Failure models add representation structure in order to specify the dependencies and causal relationships within the machine or system, and then further to plug in analysis modules based on state-of-the-art inference methods.

Figure 1:
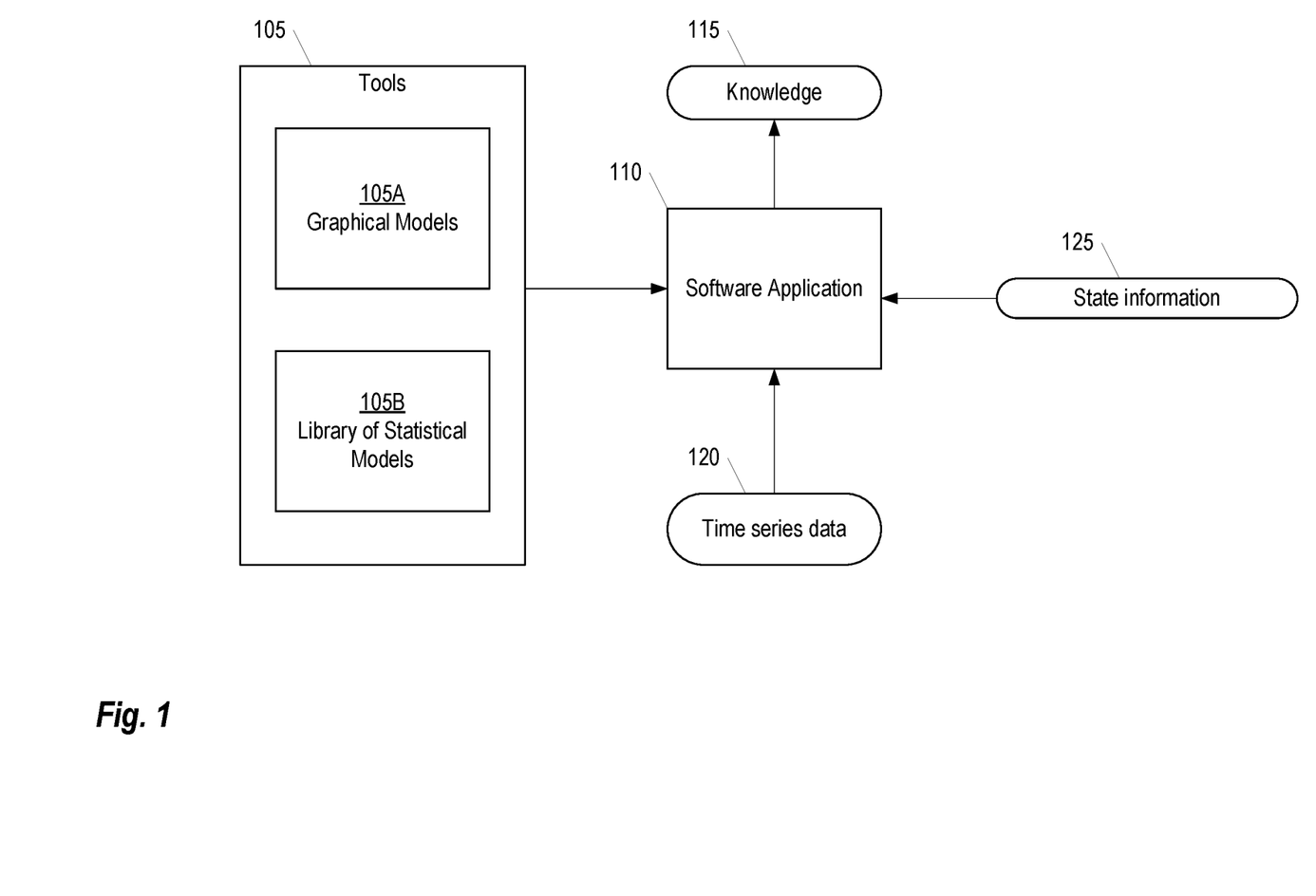
FIG. 1 provides an illustration of an example failure model and related architecture, according to some embodiments.

FIG. 1 provides an illustration of an example failure model and related architecture, according to some embodiments. Briefly, the failure model collectively comprises a plurality of Tools 105 including Graphical Models 105A and a Library of Statistical Models 105B. These Tools 105 are used by a Software Application (or "App") 110 to provide contextual Knowledge 115 and beliefs involving this knowledge about the failures occurring in the system.

The Graphical Models 105A represent all the random variables, given by set V, that may affect the failure status and the causal relationships amongst them, given by set E. Variables are either concepts that are internal to the system (e.g. mechanical components) or external (e.g. environment factors such as temperature of operation, or the quality of a material used, etc.). In one instantiation, the Graphical Models 105A are formalized by directed graphs G(V,E). A relationship in V is given by a directed edge e from E, from vertex n1 to vertex n2 in V, which means that n1 causally influences n2. The variables external to the system, ne are at the fringes of the graph. That is, there exists no directed edge from a vertex n in V to ne. The random variables V and their relationships E are taken from the design, operation, and maintenance engineers. We impose the explicit declaration of the diagnostic domain V, possibly from a domain ontology (as described in further detail below), so that this knowledge can be automatically used, adapted, and reused rather than compiled into the diagnostic system.

A Library of Statistical Models 105B provide event and abnormality detectors. A set of event and normality variables describe the concepts in the domain. The events and normality variables are a subset of V. The domain for each variable n in V will be specified (e.g. categorical, such as Boolean, or n-valued variable; continuous, real-valued variables). In addition, either a computational or statistical procedure or model for computing the value of each of the event and normality variables is needed. A statistical procedure could be, for example, a one-class support vector machine that indicates if the value of the variable is normal, or a classification procedure that classifies the incoming data (typically time series data from various sensor inputs).

The App 110 is configured to perform reasoning operations with uncertain information using the Tools 105. The App 110 uses Time Series Data 120 and State Information 125 as input. The Time Series Data 120 may be acquired, for example, from sensors present in event detectors, classifiers, and detectors. The State Information 125 generally includes any information about the state of the automation system. For example, the State Information 125 may include maintenance data stating a probability distribution (or, in particular, the value) or the state of a control variable. Based on the inputs, the App 110 generates knowledge such as the likelihood of specific states of time, the order of fault causes over time, etc.

Although the overall structure and architecture of the App 110 will vary depending on the computing environment on which it is executes, in general, the App 110 may be implemented using any computing architecture that supports executable applications. Thus, in some embodiments, a personal computer, server, or similar computing device may execute the App 110 using techniques generally known in the art. In other embodiments, the App 110 may be implemented in an embedded computing environment or on specialized computing architecture. For example, in one embodiment, the App 110 executes on a control-layer device operating in an automation environment. An example architecture for supporting control-layer device supporting apps such as App 110 is described in detail in U.S. patent application Ser. No. 15/040,565, entitled "Extending a Programmable Logic Controller with Apps," the entirety of which is incorporated herein by reference.

Once the failure model is built (manually or with automatic support using the method and principles here), it can be augmented with statistical information, e.g. probability of root causes and conditional probabilities of symptoms given other symptoms and causes at various levels in the graph structure representing the failure model. The failure model is thus created for reasoning with uncertain evidence (sensor data, test data, inspection evidence, or failures already observed), in order to bring evidence in the failure model (i.e., facts), propagate evidence about facts, and infer most likely failures that explain the data over space and time. The failure model, and its unfolding of evidence and belief over time (as a Dynamic Belief Network or DBN) captures the "state" of mechanical system and its evolution, in other words it has converted data into knowledge for reasoning about the system state and failures. This is invaluable information for service and maintenance. The reasoning App 110 can be integrated at the embedded level, or can also be used in larger scale analytics.

Figure 2:
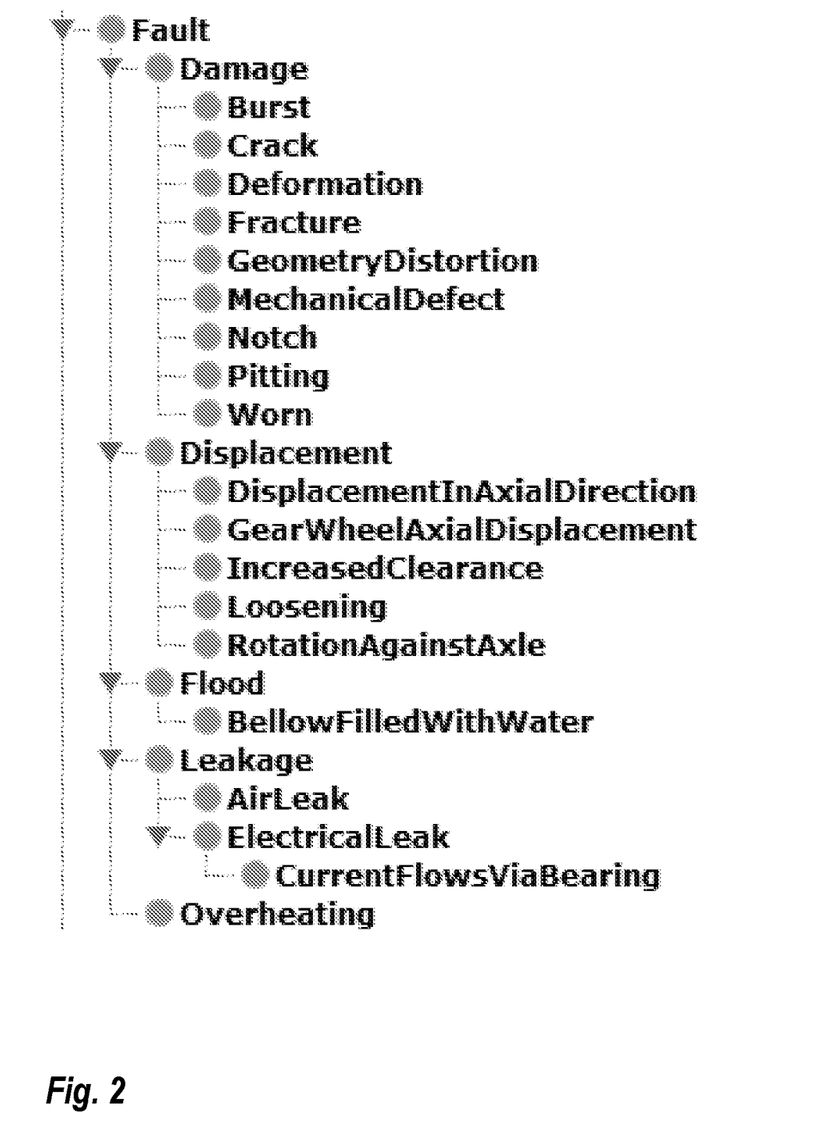
FIG. 2 illustrates a hierarchy of example failure modes (classes and subclasses), as may be used in some embodiments.

Failure model concepts are based on domain knowledge such as failure and maintenance data, and engineering knowledge from the domain. This knowledge may be structured using a hierarchy of fault classes and subclasses ("is-a" relationships), as shown in FIG. 2. For example, with reference to FIG. 2, "Worn" is a subclass of the class "Damage."

Although belief networks (BN) are generally known in the art, the BN topology definition presented herein is unique. The technique described herein provide methods for creating a topology hierarchically (e.g., from sensors to detectors) and using the detectors in a graphical structure, which uses the machine ontology. The hierarchy here refers to sensors, detectors, and then the BN or DBN which feeds of the fault or event detectors.

Figure 3:
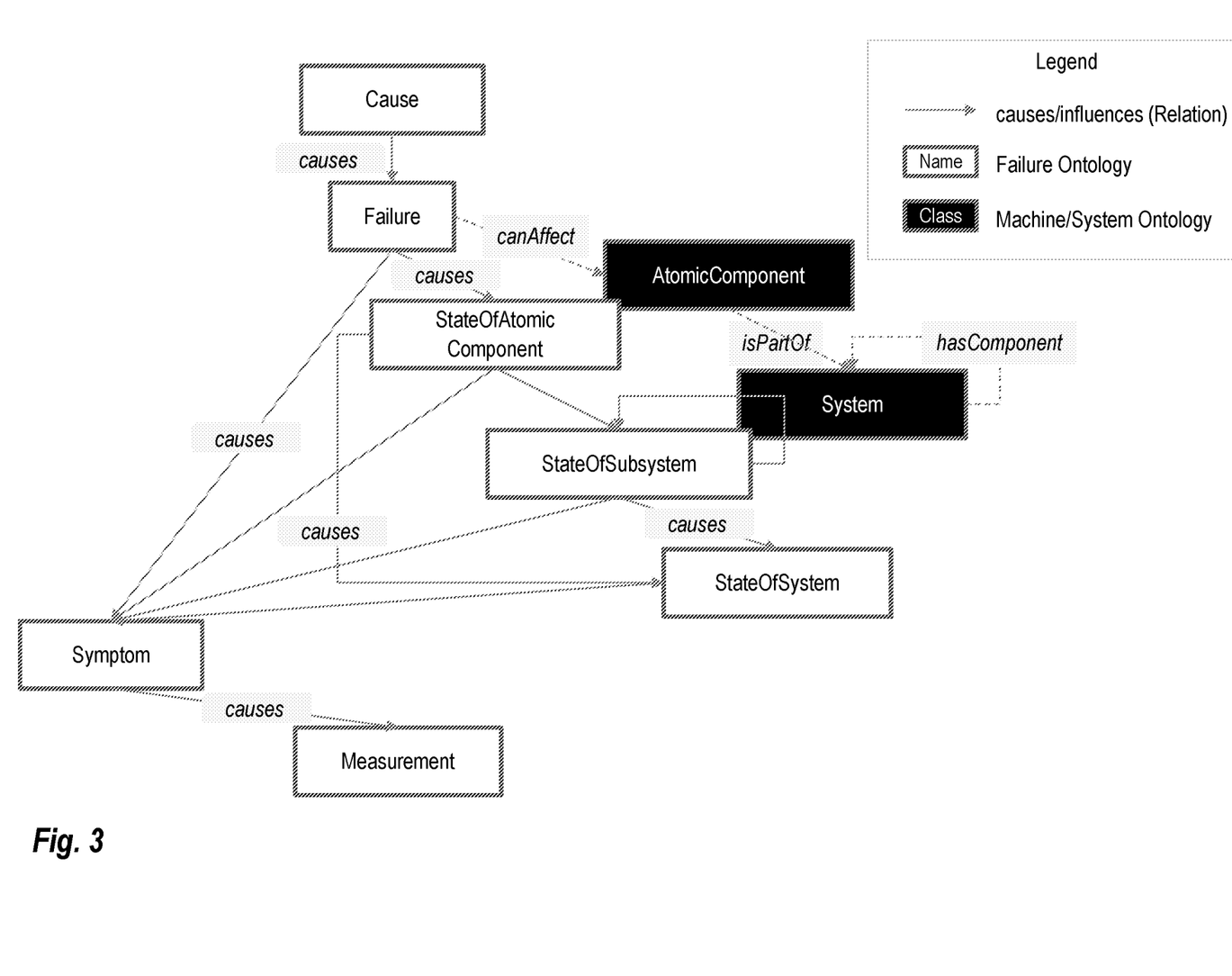
FIG. 3 shows an example of how a failure model may be defined by an ontology or hierarchy of failure variables in the form of classes and subclasses, according to some embodiments.

FIG. 3 shows an example of how a failure model may be defined by an ontology or hierarchy of failure variables in the form of classes and subclasses ("causes," "canAffect," "isPartOf," and "hasComponent" relationships), according to some embodiments. The failure model may also include automatic or manual event/fault detector methods (FD blocks). As an example, knowledge captured representing causal network amongst all the failure concepts (as random variables in V) may be used to derive axis parallelism-→causes→worn wheel flange→causes→wheel failure, etc., or wheel un-roundness→causes→wheel failure, etc. Using the principles in FIG. 3 as a skeleton, the ontology can be augmented thereafter by domain knowledge.

The failure model elements can be defined automatically or manually, during a "learning" or acquisition phase of the model. This requires also initialization using conditional probability tables for all variables in V given their parents (other nodes in V), according to the structure of G. Each of these constitutes the graphical model for reasoning with uncertainty, and it will be loaded at run time initialization. The propagation of uncertainties and reasoning uses standard interface techniques in the domain of Bayesian Networks operating on directed acyclic graphs (typically), or more generally undirected graphs.

At this point, all the knowledge can be compiled automatically (learned and formalized) into a graphical model. Traditional methods can learn the structure of a Bayesian network by trial and error (randomized search) provided a fitness or quality function is given to evaluate its topology in terms of capacity to explain the evidence from the domain. Importantly, parts of the causal network can be extracted from a domain ontology.

Figure 4:
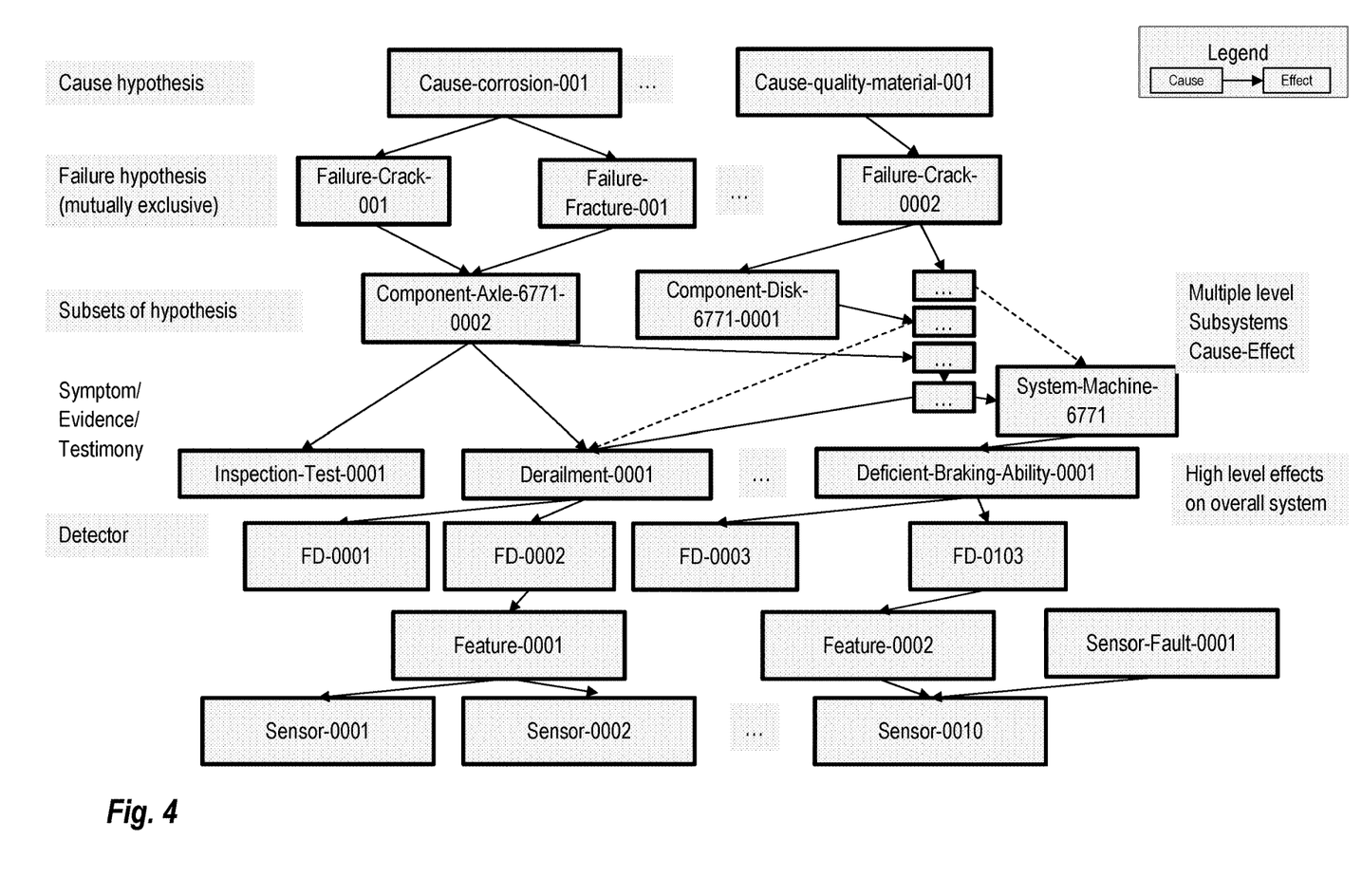
FIG. 4 shows an example failure model, including an instance hierarchy with random variables and their inter relationships, according to some embodiments.

FIG. 4 shows an example failure model, including an instance hierarchy with random variables and their inter relationships, according to some embodiments. This example was created from prototypical random variable groups based on the ontology in FIG. 3, such as fault and event detectors (FD/ED) variables, inspection/testing variables, cause variables, failure variables, component variables, subsystem and system variables, and overall system fault variables. Some of the system and subsystem variables can represent hidden nodes not explicit in the ontology, which rather connect other causes and effects represented by subsystem/system random variables. Multiple fault detectors may be built to provide different sources of evidence of normality or degree of abnormality for one variable representing the state of a system or sub system. For example, different sensors could be used in defining a statistical detector trained to capture normality with respect to this set of variables (using standard techniques for unsupervised learning such as one class support vector machines or self-organizing maps). Normality or deviations from it can be assessed on time series data statistically over a period of time. This graphical model may be updated over time.

Each node has a special meaning in the chain of cause-effect relationships. For example symptom nodes given by fault detectors built based on domain engineering knowledge will show a deviation (implemented by a statistic such as e.g. median deviation over a period of time) of an observable quantity from normal behavior, etc. up to variables representing high level effects on overall system.

The initialization of conditional probability tables for all variables in V given their parents (other nodes in V) is done according to the structure of G. Failure and maintenance data, and engineering knowledge from the domain (e.g., in the form of simulators using physics-based models) provides numerical information such as the severity of a failure, frequency of occurrence of a failure, the likelihood of accident based on the failure, the tolerability of failure errors, and statistics regarding the deviations of fault detector measurements from normal, etc. These quantitative descriptions extracted as statistics from service and maintenance records can be automatically loaded to define priors and conditional probabilities needed for initialization. Where these are missing, uniform likelihoods or domain expert input may be used.

Figure 5:
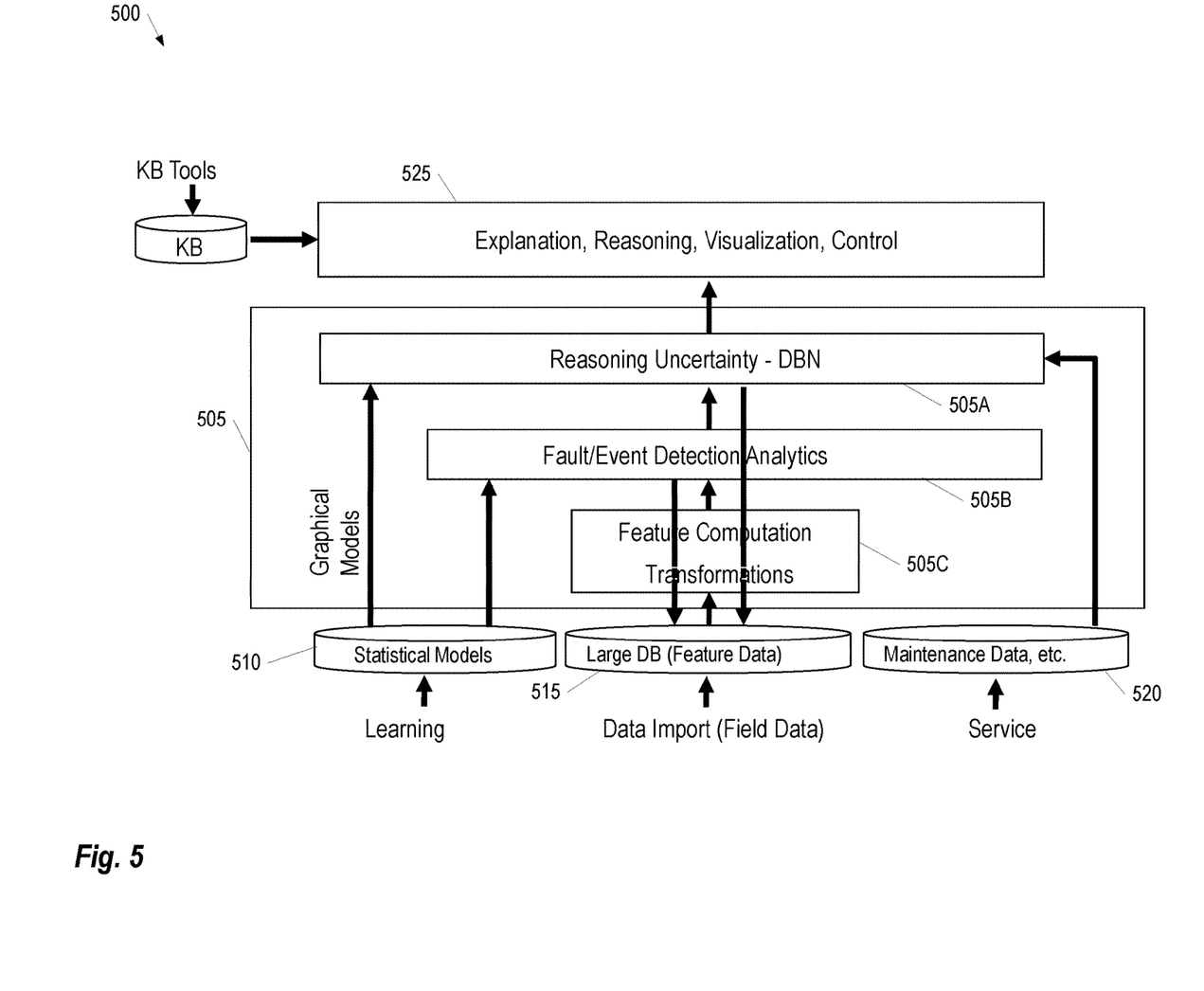
FIG. 5 provides an example of an (embedded) architecture, which reasons based on a failure model, according to some embodiments.

FIG. 5 provides an example of an architecture 500 which reasons based on a failure model, according to some embodiments. The App 505 handles reasoning about the state of the machine/system, with the following inputs: Statistical Models 510 (including graphical models for evidential reasoning with uncertainty), Feature Data 515, and Maintenance Data 520 (e.g., service reports and statistics, etc.). The app may have one or more data retrieval modules (not shown in FIG. 5) which enable the receipt or retrieval of data from external sources. The implementation of these retrieval modules can vary according to the data being retrieved and, in some instances, each data source may have its own distinct data retrieval module. In some embodiments, the data retrieval modules use standard application programming interfaces (API) for accessing data sources; while, in other embodiments, custom interfaces may be used.

The Outputs 525 of the App 505 comprise explanations, reasoning information, visualizations of failed or potentially failed system components, and control logic. In one embodiment, the Outputs 525 include the top most likely causes of failure and the state of the model (i.e., the actual belief of the value or probability distribution of each variable of the graphical model, representing the likelihoods of various states/failures).

The Feature Data 515 generally includes field data from a variety of sensors and other information sources associated with the system being monitored. For example, in the case of monitoring a bogie for faults, data may be acquired from sensors monitoring the wheels, axels, and undercarriage structure. Additional sensors may provide information from other portions of the system, control (e.g. velocity, acceleration, braking) or external factors (e.g. weather conditions). Continuing with the bogie example, sensor data may be retrieved from sensors monitoring characteristics of the car or train as a whole such as load, GPS, or mileage indicators, balance, vibration, etc. This sensor data may be varied in format and include information that is not relevant to fault detection. A Feature Computation Transformations Component 505C in the App 505 provides for reformatting and selection of relevant subsets of the data and relevant features on relevant sensors. For example, for some feature datasets, peak signal information may be the only relevant data for fault detection. In this case, the Feature Computation Transformations Component 505C may extract the peak data from the dataset and use it for later processing.

A Fault/Event Detection Analytics Component 505B in the App 505 perform analytics on the Feature Data 515 using the Statistical Models 510. Various data analysis algorithms may be included in the Fault/Event Detection Analytics Component 505B. For example, in some embodiments, these algorithms include one or more of clustering, classification, logic-based reasoning, and statistical analysis algorithms. Moreover, algorithms may be specified via a model which can be deployed during runtime on the device hosting the App 505.

The App 505 includes a dynamic belief network (DBN) 505A which performs reasoning operations on the analytics data generated by Fault/Event Detection Analytics Component 505B and Graphical Models included in the Statistical Models 510. As is generally understood in the art, a DBN comprises graphical models which are unfolded over time (through recursive random variables, each of which has amongst its parents at time (t) the variable itself at time (t−1)). Training may be performed using existing datasets relevant to the system domain showing also the system evolution. Additionally, as the DBN 505A is used to make reasoning operations it may use feedback from the user or other information from the environment to further refine its model. Once trained, the DBN 505A can be directly used to generate the Output 525 based on available inputs. DBNs are generally parallelizable due to their modularity; thus, in embodiments where the computing architecture provides multiple GPUs or other processing units, the reasoning uncertainty operations performed by the DBN could be parallelized accordingly.

The processors described herein as used by control devices may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation, the control layer devices and related computing infrastructure, may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A computer-implemented method for detecting faults and events related to an industrial system, the method comprising:
    receiving or retrieving sensor data from a plurality of sensors associated with the industrial system;
    constructing a hierarchical failure model of the industrial system using (i) the sensor data, (ii) fault data received from a plurality of fault detectors associated with the industrial system, and (iii) one or more statistical models of the industrial system, wherein the failure model comprises a plurality of diagnostic variables related to the industrial system and their relationships; and
    performing probabilistic reasoning for diagnostic or prognostic analytics on the industrial system using propagation of uncertainties in the failure model to derive knowledge related to potential or actual industrial system failures;
wherein the derived knowledge related to potential or actually system failures comprises a list of industrial system components ranked according to likelihood of causing the potential or actually industrial system failures.

2. The method of claim 1, wherein the one or more statistical models of the industrial system comprise a directed graphical model defining relationships between the plurality of diagnostic variables and industrial system failure status information.

3. The method of claim 2, wherein the plurality of diagnostic variables comprises internal system variables related to one or more industrial system components.

4. The method of claim 2, wherein the plurality of diagnostic variables comprises external system variables related to an operating environment of the industrial system.

5. The method of claim 2, wherein the failure model comprises a plurality of event and normality variables specifying normal and abnormal industrial system states.

6. The method of claim 1, wherein the derived knowledge related to potential or actual industrial system failures comprises information indicating a likelihood of particular failure states over time.

7. The method of claim 1, wherein the failure model is further constructed using collected maintenance data indicating states of one or more system variables.

8. The method of claim 7, wherein the states of the one or more system variables are each represented as a probability distribution.

9. The method of claim 1, wherein the failure model is further constructed using domain knowledge structured as a hierarchy of fault classes and subclasses related to the industrial system.

10. The method of claim 1, wherein the failure model is further constructed using an ontology of failure variables structured by class-subclass relationships.

11. A system for detecting faults and events related to an industrial system, the system comprising:
    at least one processor; and
    a non-transitory, computer-readable storage medium in operable communication with the at least one processor, wherein the computer-readable storage medium contains one or more programming instructions that, when executed, cause the at least one processor to:
        receive sensor data from a plurality of sensors associated with the industrial system;
        receive fault data from a plurality of fault detectors associated with the industrial system;
        receive one or more statistical models of the industrial system;
        construct a hierarchical failure model of the industrial system using the sensor data, the fault data and one or more statistical models of the industrial system, wherein the failure model comprises a plurality of diagnostic variables related to the industrial system; and
        perform probabilistic reasoning for diagnostic or prognostic analytics on the industrial system using propagation of uncertainties in the failure model to derive knowledge related to potential or actual industrial system failures.

12. The system of claim 11, wherein the one or more statistical models comprise a directed graphical model defining relationships between the plurality of diagnostic variables and industrial system failure status information.

13. The system of claim 12, wherein the plurality of diagnostic variables comprises internal industrial system variables related to one or more industrial system components.

14. The system of claim 12, wherein the plurality of diagnostic variables comprises external industrial system variables related to an operating environment of the industrial system.

15. The system of claim 11, wherein the knowledge related to potential or actual industrial system failures comprises information indicating a likelihood of particular failure states over time.

16. The system of claim 11, wherein the failure model is further constructed using domain knowledge structured as a hierarchy of fault classes and subclasses related to the industrial system.

17. The system of claim 11, wherein the failure model is further constructed using an ontology of failure variables structured by class-subclass relationships.

* * * * *